United States Patent
Park et al.

(10) Patent No.: US 11,646,442 B2
(45) Date of Patent: May 9, 2023

(54) ELECTROLYTE FOR LITHIUM SECONDARY BATTERY AND LITHIUM SECONDARY BATTERY INCLUDING SAME

(71) Applicant: LG Chem, Ltd., Seoul (KR)

(72) Inventors: Sol Ji Park, Daejeon (KR); Kyoung Ho Ahn, Daejeon (KR); Chul Haeng Lee, Daejeon (KR); Jun Hyeok Han, Daejeon (KR)

(73) Assignee: LG Energy Solution, Ltd.

( * ) Notice: Subject to any disclaimer, the term of this patent is extended or adjusted under 35 U.S.C. 154(b) by 304 days.

(21) Appl. No.: 16/955,211

(22) PCT Filed: Apr. 19, 2019

(86) PCT No.: PCT/KR2019/004779
§ 371 (c)(1),
(2) Date: Jun. 18, 2020

(87) PCT Pub. No.: WO2019/203622
PCT Pub. Date: Oct. 24, 2019

(65) Prior Publication Data
US 2020/0343577 A1    Oct. 29, 2020

(30) Foreign Application Priority Data

Apr. 20, 2018 (KR) .................. 10-2018-0046274
Apr. 20, 2018 (KR) .................. 10-2018-0046275

(51) Int. Cl.
*H01M 10/056* (2010.01)
*C08K 3/22* (2006.01)
*H01M 10/0525* (2010.01)

(52) U.S. Cl.
CPC ............ *H01M 10/056* (2013.01); *C08K 3/22* (2013.01); *H01M 10/0525* (2013.01); *C08K 2003/2206* (2013.01); *C08K 2003/2237* (2013.01); *C08K 2201/001* (2013.01); *H01M 2300/0068* (2013.01); *H01M 2300/0082* (2013.01); *H01M 2300/0085* (2013.01); *H01M 2300/0091* (2013.01)

(58) Field of Classification Search
CPC ....... H01M 10/056; H01M 2300/0082; H01M 2300/0091; H01M 10/0525; H01M 2300/0068; H01M 2300/0085; C08K 3/22; C08K 2003/2206; C08K 2003/2237; C08K 2201/001

See application file for complete search history.

(56) References Cited

U.S. PATENT DOCUMENTS

| | | |
|---|---|---|
| 2010/0015496 A1 | 1/2010 | Miyake et al. |
| 2014/0342268 A1 | 11/2014 | Kato et al. |
| 2017/0294678 A1 | 10/2017 | Lee et al. |
| 2018/0254523 A1 | 9/2018 | Ahn et al. |
| 2019/0115616 A1 | 4/2019 | Ahn et al. |

FOREIGN PATENT DOCUMENTS

| | | |
|---|---|---|
| CN | 104810574 A | 7/2015 |
| CN | 105609873 A | 5/2016 |
| CN | 104183869 B | 1/2017 |
| JP | 2002260962 A | 9/2002 |
| JP | 2007163865 A | 6/2007 |
| JP | 2010225390 A | 10/2010 |
| JP | 2011174032 A | 9/2011 |
| JP | 2011216226 A | 10/2011 |
| KR | 19980066878 A | 10/1998 |
| KR | 101177169 B1 | 8/2012 |
| KR | 20140097255 A | 8/2014 |
| KR | 20170113417 A | 10/2017 |
| KR | 20170126397 A | 11/2017 |
| WO | 2017196012 A1 | 11/2017 |

OTHER PUBLICATIONS

International Search Report for Application No. PCT/KR2019/004779 dated Jul. 29, 2019, 2 pages.
Zaluski et al., "Impedance Spectroscopy of a Perfluorosulfonated Ionomer Polymer Electrolyte," Journal of Physics and Chemistry of Solids, Dec. 1, 1994, pp. 1507-1512, vol. 55, No. 12.
Indian Examination Report for Indian Patent Application No. 202017025495 dated Mar. 15, 2022, 1 pg.
Extended European Search Report including Written Opinion for Application No. 19788018.0 dated Feb. 3, 2021, 7 pages.

*Primary Examiner* — James Lee
(74) *Attorney, Agent, or Firm* — Lerner David LLP

(57) ABSTRACT

The present invention provides an electrolyte for a lithium secondary battery and a lithium secondary battery including the same, the electrolyte including a polymer, and one or more selected from the group consisting of an inorganic solid electrolyte particle and a ferrodielectric, wherein the polymer includes one or more selected from the group consisting of a polymer represented by Formula 1 and a polymer including a repeating unit represented by Formula 2.

15 Claims, No Drawings

ELECTROLYTE FOR LITHIUM SECONDARY BATTERY AND LITHIUM SECONDARY BATTERY INCLUDING SAME

CROSS-REFERENCE TO RELATED APPLICATIONS

This application is a national phase entry under 35 U.S.C. § 371 of International Application No. PCT/KR2019/004779 filed Apr. 19, 2019, which claims priority from Korean Patent Application Nos. 10-2018-0046275 filed Apr. 20, 2018, and 10-2018-0046274 filed Apr. 20, 2018, all of which are incorporated herein by reference.

TECHNICAL FIELD

The present invention relates to an electrolyte for a lithium secondary battery and a lithium secondary battery including the same, and more particularly, to an electrolyte for a lithium secondary battery having excellent mechanical performance while maintaining an ion conductivity above a predetermined level, and having improved lifespan properties at room temperature and high temperatures, and a lithium secondary battery including the same.

BACKGROUND ART

A lithium secondary battery may be classified into a lithium ion battery using a liquid electrolyte and a lithium polymer battery using a polymer electrolyte depending on an electrolyte applied thereto.

The lithium ion battery has an advantage of having high capacity. However, the lithium ion battery uses a liquid electrolyte containing an electrolytic salt, so that there is a risk of leakage and explosion and a disadvantage in that the design of the battery becomes complicated due to the countermeasures thereagainst.

Meanwhile, in recent years, with the recent rapid development of electric, electronic, telecommunication, and computer industries, the demand for high-performance, high-stability secondary batteries is gradually increasing. Particularly, due to the trend in which such electronic (telecommunication) devices become smaller and more lightweight, there is a demand for developing a lithium secondary battery, which is a key component in the field, in various forms, such as being thin and small. However, the lithium ion battery has failed to meet the demand described above. Therefore, in recent years, research on a solid polymer electrolyte or a gel polymer electrolyte has been conducted in various directions.

The lithium polymer battery uses as an electrolyte a solid polymer electrolyte or a gel polymer electrolyte further containing an electrolyte solution in a polymer electrolyte, and thus, may improve safety. In addition, the lithium polymer battery has flexibility, and thus, may be developed in various forms such as being small and thin.

However, the polymer electrolyte has a significantly lower ion conductivity than the liquid electrolyte, so that there is a problem in that it is yet difficult to commercialize the polymer electrolyte. In order to overcome the above difficulties, there has been an attempt to use a linear polyethylene oxide having relatively excellent ion conductivity even in a solid state. However, the ion conductivity of the linear polyethylene oxide at room temperature is only about $1.0 \times 10^{-8}$ S/cm, which is not yet suitable for commercialization.

In order to overcome the above difficulties, as another method, there have been studies on a hybrid gel polymer electrolyte having an ion conductivity of $1.0 \times 10^{-4}$ S/cm or higher by adding an electrolyte solution to a polymer matrix in an amount of several times to as much as 10 times. A representative example of a polymer constituting such a gel polymer electrolyte is a copolymer obtained by copolymerizing two different kinds of monomers selected from vinyl chloride, vinyl acetate, acrylonitrile, styrene and methyl acrylate monomers; a copolymer of a high-polar monomer such as vinyl chloride, methyl methacrylate, vinyl alcohol and acrylic acid and a low-polar monomer such as styrene and butadiene; and a polymethylmethacrylate-based copolymer and a ternary copolymer having high affinity with an electrolyte. However, the hybrid gel polymer electrolyte has a problem in that the mechanical strength thereof is relatively low.

Therefore, there is a need for developing an electrolyte for a lithium secondary battery which is excellent in processibility, mechanical strength, and lifespan properties of a battery and has an ion conductivity above a predetermined level.

(Patent Document 1) Japanese Patent Laid-Open Publication No. 2007-163865

DISCLOSURE OF THE INVENTION

Technical Problem

An aspect of the present invention provides an electrolyte for a lithium secondary battery and a lithium secondary battery including the same, the electrolyte excellent in processibility and mechanical performance of a battery while maintaining an ion conductivity above a predetermined level, and excellent in lifespan properties at room temperature and high temperatures.

Technical Solution

According to an aspect of the present invention, there is provided an electrolyte for a lithium secondary battery including a polymer, and one or more selected from the group consisting of an inorganic solid electrolyte particle and a ferrodielectric, wherein the polymer includes one or more selected from the group consisting of a polymer represented by Formula 1 below and a polymer including a repeating unit represented by Formula 2 below.

[Formula 1]

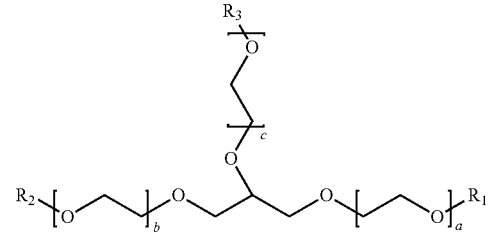

In Formula 1, $R_1$, $R_2$, and $R_3$ are each independently hydrogen or $-CH_2-CH=CH_2$, wherein at least one of the $R_1$, $R_2$, and $R_3$ is $-CH_2-CH=CH_2$ and a, b, and c are each independently an integer of 1 to 10,000.

[Formula 2]

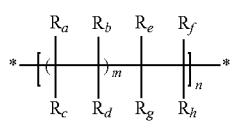

In Formula 2, $R_a$ to $R_d$ are each independently an element selected from the group consisting of H, F, Cl, Br, and I, $R_e$ to $R_h$ are each independently one selected from the group consisting of H, F, Cl, Br, and *—$OR_0SO_3^-M^+$, and $R_0$ is an alkylene group having 1 to 5 carbon atoms in which at least one hydrogen is substituted with a halogen element, wherein the $M^+$ is one selected from the group consisting of $H^+$, $Li^+$, $Na^+$, and $K^+$, and at least one of the $R_e$ to $R_h$ is *—$OR_0SO_3^-M^{+-}Li^+$, and m and n are each independently an integer of 1 to 10,000.

At this time, the inorganic solid electrolyte particle may include at least one element selected from the group consisting of Li, La, Zr, O, Ti, Al, Ge, P, W, Nb, Te, Ln, Si, Nd, N, S, Ba, Ga, In, F, Cl, Br, I, As, Se, Sb, Sn, and Ru.

The ferrodielectric may include at least one element selected from the group consisting of Li, La, O, Ti, Ge, P, Nb, Te, Ba, K, H, D, Ta, Bi, Pb, Rbm and As.

According to another aspect of the present invention, there is provided a lithium secondary battery including the electrolyte for a lithium secondary battery

Advantageous Effects

An electrolyte for a lithium secondary battery according to the present invention includes an inorganic solid electrolyte particle and/or a ferrodielectric in addition to a polymer of a specific structure, and thus, is excellent in mechanical stability, and lifespan properties at room temperature and high temperatures while being excellent in ion conductivity.

Best Mode for Carrying Out the Invention

Hereinafter, the present invention will be described in more detail.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Meanwhile, unless otherwise specified in the present invention, the "*" symbol refers to a portion connected between ends of the same or different atoms or chemical formulas.

In addition, in the present invention, a weight average molecular weight (Mw) may be measured by Gel Permeation Chromatography (GPC). For example, a sample specimen of a predetermined concentration is prepared, and a GPC measurement system Alliance 4 device is stabilized. When the device is stabilized, a standard specimen and the sample specimen are injected into the device to obtain a chromatogram, and a molecular weight is calculated according to an analysis method (System: Alliance 4, column: Ultrahydrogel linear X 2, eluent: 0.1 M $NaNO_3$ (pH 7.0 phosphate buffer, flow rate: 0.1 mL/min, temp: 40° C., injection: 100 μL).

Electrolyte for Lithium Secondary Battery

An electrolyte for a lithium secondary battery according to the present invention includes a polymer, and one or more selected from the group consisting of an inorganic solid electrolyte particle and a ferrodielectric. The polymer includes one or more selected from the group consisting of a polymer represented by Formula 1 below and a polymer including a repeating unit represented by Formula 2 below.

[Formula 1]

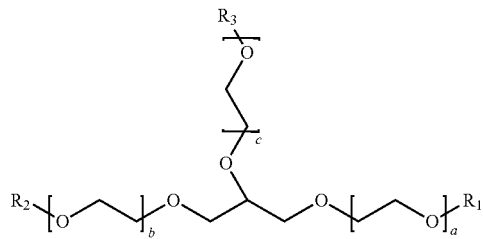

In Formula 1, $R_1$, $R_2$, and $R_3$ are each independently hydrogen or —$CH_2$—CH=$CH_2$, wherein at least one of the $R_1$, $R_2$, and $R_3$ is —$CH_2$—CH=$CH_2$ and a, b, and c are each independently an integer of 1 to 10,000.

[Formula 2]

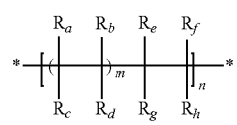

In Formula 2, $R_a$ to $R_d$ are each independently an element selected from the group consisting of H, F, Cl, Br, and I, $R_e$ to $R_h$ are each independently one selected from the group consisting of H, F, Cl, Br, and *—$OR_0SO_3^-M^+$, and $R_0$ is an alkylene group having 1 to 5 carbon atoms in which at least one hydrogen is substituted with a halogen element, wherein the $M^+$ is one selected from the group consisting of $H^+$, $Li^+$, $Na^+$, and $K^+$, and at least one of the Re to $R_h$ is *—$OR_0SO_3^-M^{+-}Li^+$, and m and n are each independently an integer of 1 to 10,000.

When compared to a liquid electrolyte, a typical linear polyethylene oxide-based solid polymer electrolyte has a problem in that the resistance in a battery is high that the moving speed of lithium ions is slow, and thus, the ion conductivity at room temperature is low, and that the oxidation potential is less than 4 V, which makes it difficult to drive a battery.

In order to solve the problem, in the present invention, a polymer represented by Formula 1, which is a polyethylene oxide-based polymer of a branch (or star shape) structure, not of a typical linear structure, is cross-linked to facilitate the formation of an inter-polymer network so that ion conductivity, mechanical properties and oxidation potential stability may be improved.

Specifically, the weight average molecular weight (Mw) of the polymer represented by Formula 1 may be 1,000 g/mol to 1,000,000 g/mol, specifically 5,000 g/mol to 500,000 g/mol, more specifically 10,000 g/mol to 200,000 g/mol. When the weight average molecular weight of the polymer is within the above range, the mechanical properties of an electrolyte for a lithium secondary battery are improved so that it is advantageous in forming a film, and an oxidation potential is increased, and the deterioration in battery performance at high temperatures and high voltages may be suppressed.

More specifically, the polymer represented by Formula 1 may be at least one selected from the group consisting of polymers represented by Formulas 1a to 1c.

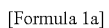
[Formula 1a]

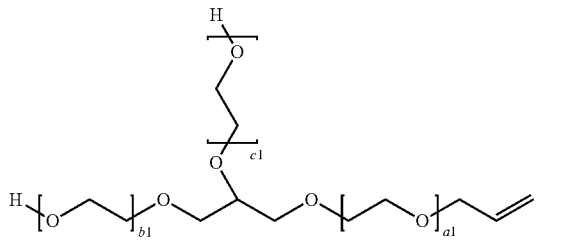

[Formula 1b]

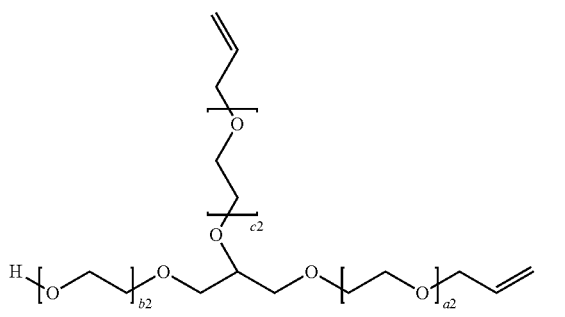

[Formula 1c]

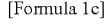

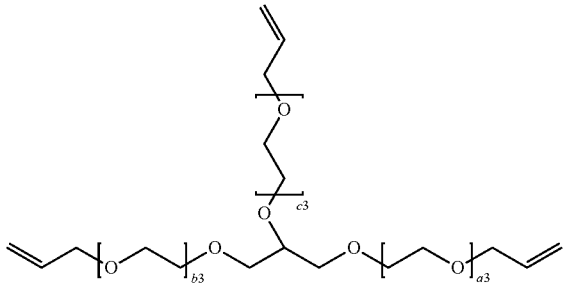

In Formula 1a to Formula 1c, a1 to a3, b1 to b3, and c1 to c3 are each independently an integer of 1 to 10,000.

Meanwhile, in the case of a solid polymer electrolyte or a gel polymer electrolyte using a typical polymer, the resistance in a battery is greater than that of a liquid electrolyte, so that the moving speed of lithium ions is slow, and thus, there is a problem in that the ion conductivity is low, In order to solve the problem, in the present invention, the polymer including a repeating unit containing a cation ($M^+$) and a sulfonate group ($SO_3^-$) is used, so that the movement effect of lithium ions may be improved.

Particularly, when the cation is a lithium cation ($Li^+$), since the lithium cation ($Li^+$) has a transference number close to 1, the flux of lithium ions is allowed to be uniform, thereby reducing the generation of dendrites, so that an effect of improving lifespan may be obtained. In addition, by including a sulfonate group ($SO_3^-$), an exothermic reaction and the like caused by an anion repulsion effect by lithium ions may be suppressed to secure thermal safety.

Accordingly, when the polymer represented by Formula 2 is used, when compared with a typical solid polymer electrolyte, the ion conductivity is excellent and lifespan properties at room temperature and high temperatures are improved, so that thermal stability may also be secured.

Meanwhile, in Formula 2, a m:n molar ratio may be 1:1 to 10:1, preferably 1:1 to 9:1, more preferably 1:1 to 7:1. When the m:n molar ratio is within the above range, the movement properties of lithium ions ($Li^+$) in an electrolyte for a lithium secondary battery are improved and the flux of the lithium ions ($Li^+$) is maintained to be uniform, so that the generation of dendrites and the like may be suppressed.

Specifically, $R_0$ may be one selected from the group consisting of *—$CF_2$—*, *—$CF_2CF_2$—*, and *—$CHCF_3CF_2$—*, and preferably, $R_0$ may be *—$CF_2CF_2$—*. Among halogen elements, an alkylene group substituted with fluorine is used as $R_0$ because when fluorine which has a high electronegativity is substituted, it is easy to dissociate a cation ($M^+$) present on a polymer structure.

The weight average molecular weight (Mw) of the polymer represented by Formula 2 may be 5,000 g/mol to 2,000,000 g/mol, specifically 100,000 g/mol to 1,000,000 g/mol. When the weight average molecular weight of the polymer is within the above range, the mechanical properties of an electrolyte for a lithium secondary battery are improved so that it is advantageous in forming a film, and an oxidation potential is increased to improve oxidation stability. In addition, the deterioration in battery performance at high temperatures and high voltages may be suppressed.

For example, the repeating unit represented by Formula 2 may be at least one selected from the group consisting of repeating units represented by Formula 2a and Formula 2b.

[Formula 2a]
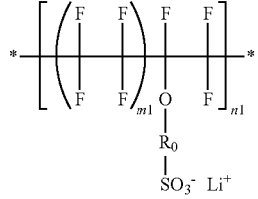

[Formula 2b]
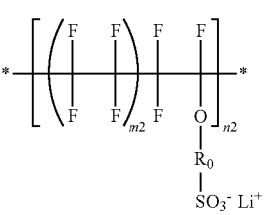

In Formula 2a and Formula 2b, m1, m2, n1, and n2 are each independently an integer of 1 to 10,000, and $R_0$ is an alkylene group having 1 to 5 carbon atoms in which at least one hydrogen is substituted with a halogen element.

In addition, in Formula 2a and Formula 2b, a m1:n1 (molar ratio) and a m2:n2 (molar ratio) may each be independently 1:1 to 10:1, preferably 1:1 to 9:1, more preferably 1:1 to 7:1.

More specifically, the repeating unit represented by Formula 2a may include at least one repeating unit selected from the group consisting of repeating units represented by Formula 2a-1 to Formula 2a-3 below.

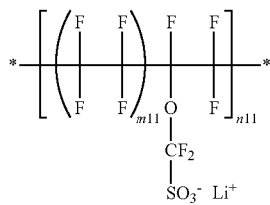

[Formula 2a-1]

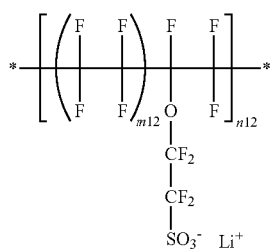

[Formula 2a-2]

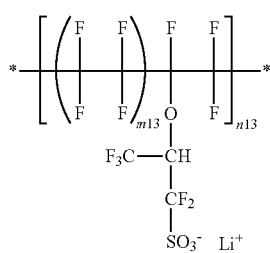

[Formula 2a-3]

M11 to m13 and n11 to n13 are each independently an integer of 1 to 10,000.

In Formula 2a-1 to Formula 2a-3, a m11:n11 (molar ratio), a m12:n12 (molar ratio), and a m13:n13 (molar ratio) may each be independently 1:1 to 10:1, preferably 1:1 to 9:1, more preferably 1:1 to 7:1.

In addition, the repeating unit represented by Formula 2b may include at least one repeating unit selected from the group consisting of repeating units represented by Formula 2b-1 to Formula 2b-3 below.

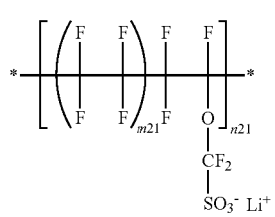

[Formula 2b-1]

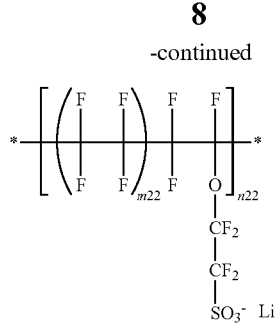

[Formula 2b-2]

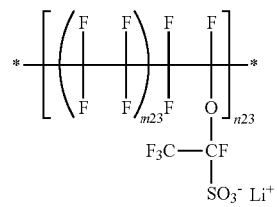

[Formula 2b-3]

In Formula 2b-1 to Formula 2b-3, m21 to m23 and n21 to n23 are each independently an integer of 1 to 10,000.

In Formula 2b-1 to Formula 2b-3, a m21:n21 (molar ratio), a m22:n22 (molar ratio), and a m23:n23 (molar ratio) may each be independently 1:1 to 10:1, preferably 1:1 to 9:1, more preferably 1:1 to 7:1.

Meanwhile, the electrolyte for a lithium secondary battery according to the present invention includes one or more selected from the group consisting of an inorganic solid electrolyte particle and a ferrodielectric.

When compared with a case in which only a polymer is used as an electrolyte for a lithium secondary battery, when an inorganic solid electrolyte particle or a ferrodielectric having greater mechanical strength is used theretogether, the performance as well as mechanical safety of a battery may be further improved.

More specifically, an inorganic solid electrolyte particle has not only higher mechanical strength but also higher ion conductivity than a polymer, and thus, may improve a movement effect of lithium ions. In addition, an inorganic solid electrolyte particle is not easily burned or cause ignition even under high temperature conditions of 400° C. or higher, thereby having high-temperature safety. Accordingly when the inorganic solid electrolyte particle is used together, not only the mechanical strength of the electrolyte for a lithium secondary battery, but also the ion conductivity and high-temperature safety thereof may be improved.

The inorganic solid electrolyte particle may include at least one element selected from the group consisting of Li, La, Zr, O, Ti, Al, Ge, P, W, Nb, Te, Ln, Si, Nd, N, S, Ba, Ga, In, F, Cl, Br, I, As, Se, Sb, Sn, and Ru.

More specifically, the inorganic solid electrolyte particle may include at least one element selected from the group consisting of NASICON ($(Na_{1+x}Zr_2Si_xP_{3-x}O_{12})$, $0<x<3$), LISICON ($Li_{2+2x1}Zn_{1-x1}GeO_4$), $0<x1<1$)), thio-LISICON ($Li_{2+2x2}Zn_{1-x2}GeS_4$), $0<x2<1$)), LLZO ($Li_7La_3Zr_2O_7$), LAGP ($Li_{1.5}Al_{0.5}Ge_{1.5}$ $(PO_4)_3$), LATP ($Li_{1.3}Al_{0.3}Ti_{1.7}$ $(PO_4)_3$), LLTO ($La_{0.57}Li_{0.29}TiO_3$), $Li_3N$, $Ln_{1/3}NbO_3$ (Ln=one selected from the group consisting of La, Ce, Pr and Nd), $Li_3W_2Ln_3O_{12}$, $Li_3Te_2Ln_3O_{12}$, $Na_{1+y}Zr_2Si_yP_{3-y}O_{12}$ ($0<y<3$), $LiTi_2$ $(PO_4)_3$, $Li_{1.3}Al_{0.3}Ti_{1.7}$ $(PO_4)$ 3, $Li_{10}GeP_2S_{12}$, $Li_{10}GeP_2S_{12}$, $Li_{3.25}G_{0.65}P_{0.75}S_4$, and $Li_{9.54}Si_{1.74}P_{1.44}S_{11.7}Cl_{0.3}$.

Meanwhile, a typical gel polymer electrolytes or a solid polymer electrolyte has a problem in that lithium ions are not uniformly positioned in an electrolyte, thereby forming dendrites caused by the non-uniformity of lithium ion concentration gradients.

In order to solve the problem, in the present invention, as a component of an electrolyte for a lithium secondary battery, a ferrodielectric is used to allow lithium ions to be positioned uniformly. A ferrodielectric is a material which may affect an electric field, or may have a dipole moment by showing a polarization phenomenon voluntarily even when there is no electric field. When a ferrodielectric is included in an electrolyte, an electric field is affected thereby to allow lithium ions to be uniformly positioned, so that the generation of dendrites caused by the non-uniformity of the concentration of lithium ions may be suppressed.

The ferrodielectric may include at least one element selected from the group consisting of Li, La, O, Ti, Ge, P, Nb, Te, Ba, K, H, D, Ta, Bi, Pb, Rbm and As.

More specifically, the ferrodielectric may include at least one selected from the group consisting of $BaTiO_3$, $KH_2PO_4$, $KD_2PO_4$, $RbH_2PO_4$, $KH_2AsO_4$, GeTe, $SrTiO_3$, $KNbO_3$, $PbTiO_3$, $LiTaO_3$, $LiNbO_3$, $PbNb_2O_6$, $Bi_9Ti_3O_{12}$, $PbBi_2Nb_2O_9$, $LiTaO_3$, $PbTa_2O_6$, $BaNb_2O_6$, $SrNb_2O_6$, $Pb_{0.5}Ba_{0.5}Nb_2O_6$, $Sr_{0.5}Ba_{0.5}Nb_2O_6$, lead zirconate titanate (PZT), PT, $Pb(Mg_{1/3}Nb_{2/3})O_3$ (PMN), and lead lanthanum zirconate titanate (PLZT).

One or more selected from the group consisting of the inorganic solid electrolyte particle and the ferrodielectric may be included in an amount of 10 parts by weight to 900 parts by weight, preferably 25 parts by weight to 400 parts by weight based on 100 parts by weight of the polymer. When included within the above range, the generation of dendrites caused by the flexibility of a polymer is suppressed while the ion conductivity, mechanical strength, and high-temperature safety of a lithium secondary battery electrolyte are improved, so that the lifespan performance of a battery may be improved.

Meanwhile, when the polymer represented by Formula 1 is used as a polymer for a lithium secondary battery, in order to maintain the shape thereof uniformly, the polymer represented by Formula 1 may be cured using at least one selected from the group consisting of a photo curing agent and a thermal curing agent.

More specifically, a UV curing agent and the like may be typically used as the photo curing agent, and examples the UV curing agent may include at least one selected from the group consisting of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-propanone, oxy-phenylacetic acid 2-[2-oxo-2 phenyl-acetoxy-ethoxy]-ethyl ester, oxy-phenyl-acetic 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, bis(eta 5-2,4-cyclopentadiene-1-yl), bis [2,6-difluoro-3-(1H-pyrrol-1-yl) phenyl]titanium, 4-isobutylphenyl-4'-methylphenyliodonium, hexafluorophosphate, and methylbenzoylformate.

Meanwhile, examples of the thermal curing agent may include benzoyl peroxide, acetyl peroxide, dilauryl peroxide, di-tert-butyl peroxide, t-butyl peroxy-2-ethyl-hexanoate, cumyl hydroperoxide, and hydrogen peroxide, and at least one selected from the group consisting of 2,2'-azobis (2-cyanobutane), dimethyl 2,2'-azobis (2-methylpropionate), 2,2'-azobis (methylbutyronitrile), 2,2'-azobis (isobutyronitrile) (AIBN), and 2,2'-azobisdimethyl-valeronitrile (AMVN).

The curing agent may be decomposed by light such as UV at room temperature (5° C. to 30° C.) in a battery, or discomposed by heat of 30° C. to 100° C. to form a radical and initiate a free radical polymerization reaction, and thus, may crosslink the polymer represented by Formula 1.

At this time, the photo/thermal curing agent may be included in an amount of 0.1 parts by weight to 10 parts by weight, more preferably 0.1 parts by weight to 1 part by weight based on 100 parts by weight of the polymer represented by Formula 1. When the curing agent is included within the content range, the cross-linking reaction between polymers is facilitated so that an electrolyte for a lithium secondary battery may be formed in a uniform thickness and the polymerization rate within a polymer electrolyte may be controlled, thereby preventing a disadvantage in which unreacted curing agent remains and adversely affects the performance of a battery.

Meanwhile, the polymer represented by Formula 1 is cross-linked by a radical reaction, and if oxygen is first reacted with a radical before the polymer initiates the cross-linking reaction, the radical reaction may not be progressed continuously, so that the degree of cross-linking may be lowered. Accordingly, in order to facilitate the cross-linking reaction at room temperature, an oxygen ($O_2$) inhibitor for collecting and removing oxygen may be further included. A representative example of the oxygen inhibitor may be tris(2,2,2-trifluoroethyl) phosphite (TFEPi).

The oxygen inhibitor may be included in an amount of 0.1 wt % to 10 wt % based on the total weight of an electrolyte composition for a lithium secondary battery. When included in the above content ratio, oxygen is removed and a side reaction is prevented from occurring, so that the cross-linking polymerization reaction of the polymer may proceed more efficiently.

The electrolyte for a lithium secondary battery may be a solid electrolyte or a gel electrolyte.

Specifically, when the electrolyte for a lithium secondary battery according to the present invention is a solid electrolyte, the electrolyte may be formed according to a typical solution casting method known in the art. That is, the electrolyte for a lithium secondary battery according to the present invention may be dissolved in an organic solvent to be prepared in a coating solution form, and then flexibly coated (casting film formation) on a support substrate, and dried to be formed a film form.

At this time, as the support substrate, a glass substrate, polyethylene terephthalate (PET), Teflon, or an FEP film, and the like may be used, or an electrode or a separator may be used.

Meanwhile, when the electrolyte for a lithium secondary battery according to the present invention is a solid electrolyte, the electrolyte may be formed, in order to facilitate the passage of a cation (Li+) which is an ion transfer agent, and minimize the deterioration in performance according to the total volume of a lithium secondary battery while maintaining the strength above a predetermined level, in a thickness of 0.1 μm to 300 μm, more specifically, 10 μm to 100 μm, even more specifically 10 μm to 50 μm. In addition, when a solid electrolyte is applied to a lithium secondary battery, the solid electrolyte may be used as a substitute for a separator. However, when an electrolyte to be finally prepared is a gel electrolyte, a solid electrolyte in a film form is formed to have a thickness of 2 μm or less, more preferably 20 nm to 2 μm.

Meanwhile, when the electrolyte for a lithium secondary battery of the present invention is a gel electrolyte, a non-aqueous electrolyte solution is used together to improve ion transfer properties and at the same time, to implement an electrolyte system that is more stable than a liquid electrolyte.

The non-aqueous electrolyte includes, specifically, an electrolyte salt and a non-aqueous electrolyte solvent. The electrolyte salt may be included to improve ion conductivity. Any electrolyte salt may be used without particular limitation as long as it is typically used in an electrolyte salt. For example, the electrolyte salt may include at least one cation selected from the group consisting of $H^+$, $Li^+$, $Na^+$, and $K^+$, and as an anion, at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$. Specifically, the electrolyte salt may include a lithium salt containing $Li^+$ as a cation, specifically, a single material or a mixture of two or more selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$. Specifically, the electrolyte salt may include a single material or a mixture of two or more selected from the group consisting of $LiPF_6$, $LiBF_4$, $LiCH_3CO_2$, $LiCF_3CO_2$, $LiCH_3SO_3$, LiFSI, LiTFSI, and $LiN(C_2FsSO_2)_2$.

Meanwhile, the electrolyte salt may include any one or more thereof within a range typically usable, and in order to obtain an optimum effect of forming an anti-corrosive film on the surface of an electrode, may be included in a concentration of 0.5 M to 4 M in a non-aqueous electrolyte solution. If the concentration of the electrolyte salt is greater than 4 M, the viscosity is high, so that the ion transfer properties may be significantly reduced.

The non-aqueous electrolyte solvent is not limited as long as it can minimize decomposition by an oxidation reaction and the like during charging and discharging of a lithium secondary battery, and can exhibit desired properties together with an additive. For example, an ester-based solvent, an ether-based solvent, or an amide-based solvent may be used alone or in combination of two or more thereof.

Examples of the ether-based solvent may be at least one compound selected from the group consisting of dimethyl ether, diethyl ether, dipropyl ether, methyl ethyl ether, methyl propyl ether, ethyl propyl ether, 1,3-dioxolane (DOL), and 2,2-bis (trifluoromethyl)-1,3-dioxolane (TFDOL).

In addition, the ester-based solvent may include at least one compound selected from the group consisting of a cyclic carbonate compound, a linear carbonate compound, a linear ester compound, and a cyclic ester compound.

Specific examples of the cyclic carbonate compound may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC).

Also, specific examples of the linear carbonate compound may include any one selected from the group consisting of dimethyl carbonate (DMC), diethyl carbonate (DEC), dipropyl carbonate, ethyl methyl carbonate (EMC), fluoromethyl methyl carbonate (FMMC), fluoroethyl methyl carbonate (FEMC), methyl propyl carbonate, and ethyl propyl carbonate, or a mixture of two or more thereof.

Specific examples of the linear ester compound may include any one selected from the group consisting of methyl acetate, ethyl acetate, propyl acetate, methyl propionate, ethyl propionate, propyl propionate, and butyl propionate, or a mixture of two or more thereof, but are not limited thereto.

Specific examples of the cyclic ester compound may include any one selected from the group consisting of γ-butyrolactone, γ-valerolactone, γ-caprolactone, σ-valerolactone, and ε-caprolactone, or a mixture of two or more thereof, but are not limited thereto.

Among the ester-based solvents, when a cyclic carbonate-based compound which is an organic solvent of high viscosity having high dielectric constant, thereby dissociating an electrolyte salt in an electrolyte well and a linear carbonate-based compound of low viscosity and low dielectric constant, such as fluoromethyl methyl carbonate (FMMC) or fluoroethyl methyl carbonate (FEMC), and a linear ester-based compound are mixed in an appropriate ratio and used, an electrolyte solution having a high electric conductivity may be prepared.

Particularly, as the non-aqueous electrolyte solution, when an ether-based solvent, an ester-based solvent, and the like are used alone or in combination, it is more preferable that at least one fluorine-based compound is included. The fluorine-based compound may be at least one selected from the group consisting of 2,2-bis (trifluoromethyl)-1,3-dioxolane, which is an ether-based compound, fluoroethylene carbonate (FEC), which is a cyclic carbonate compound, and fluoromethylmethyl carbonate (FMMC) and fluoroethylmethyl carbonate (FEMC) which are linear carbonate compounds. It is preferable that the fluorine-based compound is included at 1 vol % or greater based on the total volume of a non-aqueous electrolyte solvent.

Meanwhile, in order to prevent the non-aqueous electrolyte solution from being volatilized and to maintain a gel electrolyte form thereof, a non-volatile organic solvent having a high boiling point such as tetraglyme may be additionally used.

The amount of the non-aqueous electrolyte solvent to be used is not particularly limited. However, the non-aqueous electrolyte solution may be used within a content range capable of sufficiently impregnating an electrode assembly by a typical method, and may be used within a range capable of securing the uniformity of a film when forming a gel polymer electrolyte, and sufficiently securing the mechanical strength, thin film thickness and ion conductivity effect.

In addition, the non-aqueous electrolyte solution of the present invention may further include an ionic liquid if necessary.

The ionic liquid is a component having high ion conductivity, so that by improving the movement of lithium ions ($Li^+$ flux) in a gel electrolyte, a phenomenon in which Li+ are plated or stripped on the surface of a negative electrode is unformed to suppress the generation of lithium dendrites, and the flame retardant properties thereof may bring stability when applied inside a battery.

For example, the ionic liquid may include one or more selected from the group consisting of diethylmethylammonium trifluoromethanesulfonate, dimethylpropylammonium trifluoromethanesulfonate, N,N-diethyl-N-methyl-N-(2-methoxyethyl) ammonium bis(trifluoromethanesulfonyl) imide, N-methyl-N-propylpiperidinium bis (trifluoromethylsulfonyl)imide, N-butyl-N-methyl pyrrolidinium bis (trifluoromethylsulfonyl)imide, and Methylpropylpiperidyl-trifluoro methane sulfonimide.

The ionic liquid may be included in an amount of 50 wt % or less based on the total weight of the non-aqueous electrolyte solution, specifically 0.01 wt % to 50 wt %, more specifically 0.01 wt % to 20 wt %. When the ionic liquid is included within the above range, a certain level of viscosity is maintained to improve the mobility of lithium ions and to provide a uniform lithium ion movement effect, so that the formation of lithium dendrites on the surface of a negative electrode may be suppressed.

Preparation Method of Electrolyte for Lithium Secondary Battery

Next, a method for preparing an electrolyte for a lithium secondary battery according to the present invention will be described.

The method for preparing an electrolyte for a lithium secondary battery varies depending on an electrolyte to be prepared is a solid electrode or a gel electrolyte.

First, a method for preparing a solid electrolyte among electrolytes for a lithium secondary battery will be described. The method includes (1) preparing a composition for an electrolyte, (2) coating the composition for an electrolyte, and (3) drying the coated composition for an electrolyte.

Specifically, when the steps (1) to (3) are performed, a solid electrolyte may be formed, and thereafter, when a step (4) of impregnating the coated solid electrolyte in a non-aqueous electrolyte solution is further performed, a gel electrolyte may be formed.

Meanwhile, when the electrolyte for a lithium secondary battery is prepared, if a polymer represented by Formula 1 is used as a polymer, after the step (3) and before the step (4), a curing step of cross-linking the polymer according to Formula 1 using a photo/thermal agent may further be included to secure mechanical strength.

(1) Preparing Composition for Electrolyte for Lithium Secondary Battery

A composition for an electrolyte for a lithium secondary battery including one or more selected from the group consisting of an organic solvent, a polymer, an inorganic solid electrolyte particle and a ferrodielectric is prepared. A this time, the polymer, the inorganic solid electrolyte particle, and the ferrodielectric are the same as those described above, and thus, the descriptions thereof will be omitted.

As the organic solvent, a volatile organic solvent having a low boiling point may be used to facilitate the removal thereof, and representative examples thereof may include at least one selected from the group consisting of N,N'-dimethylacetamide, N-methyl-2-pyrrolidone (NMP), dimethyl sulfoxide (DMSO), N,N-dimethylformamide (DMF), and acetonitrile (AN). Specifically, N-methyl-2-pyrrolidone is preferable.

The amount of the organic solvent to be used is not particularly limited as long as it is an amount that may be easily removed after a polymer is dissolved and uniformly coated. Specifically, the organic solvent may be used in an amount of about 100 parts by weight to 10,000 parts by weight, specifically 1,000 parts by weight to 10,000 parts by weight based on 100 parts by weight of the polymer.

When the amount of the organic solvent to be used is within the above range, a polymer is easily dissolved in the organic solvent later, and a film of a uniform thickness may be formed using a composition for an electrolyte. Even after a film is formed, the film may be easily removed so that problems caused by a residual film such as the generation of side reactions or the deterioration in the mechanical strength of an electrolyte may be prevented.

Meanwhile, if a polymer represented by Formula 1 is used as a polymer, in order to cross-link the polymer represented by Formula 1, when preparing the composition for an electrolyte, at least one selected from the group consisting of a photo-curing agent and a thermal-curing agent may be included to form the composition for an electrolyte. Since the photo-curing agent and the thermo-curing agent have already been described, the descriptions thereof will be omitted.

(2) Coating Composition for Electrolyte for Lithium Secondary Battery

Next, a step of coating a composition for an electrolyte for a lithium secondary battery will be described. As the coating method, a typical coating method may be used. For example, bar coating, spin coating, roll coating, slot die coating, hand coating, spray coating and the like may be used, and one method thereof may be used alone, or two or more methods thereof may be used in combination.

At this time, the composition for an electrolyte for a lithium secondary battery may be coated on one surface of a support substrate, and the type of support substrate may vary depending on the form of an electrolyte. For example, a stand-alone solid electrolyte is prepared in the form of a film, and is interposed (introduced) between a negative electrode, a positive electrode, and a separator which are manufactured already. Therefore, the stand-alone solid electrolyte is coated on a support substrate such as a glass substrate, PET (polyethylene terephthalate), Teflon, or a FEP film and the like, and then finally formed into the form of a film separated from the support substrate.

Meanwhile, when a composition electrode or a separator is used as a support substrate, the stand-alone solid electrolyte is directly coated on the coated negative electrode, positive electrode, and separator, and thus, may not be separated from the support substrate.

Meanwhile, by controlling the amount of the composition for an electrolyte for a lithium secondary battery to be coated, the thickness of an electrolyte for a lithium secondary battery to be finally formed may be appropriately controlled. At this time, depending on whether the type of an electrolyte to be prepared later is a gel electrolyte or a solid electrolyte, the thickness of the electrolyte may be controlled differently.

(3) Drying Composition for Electrolyte for Lithium Secondary Battery

Next, the coated composition for an electrolyte for a lithium secondary battery is dried to remove an organic solvent included in the composition.

The drying conditions are not particularly limited to a specific temperature. However, in order to minimize the damage to components in the composition for an electrolyte for a lithium secondary battery, the drying is performed under vacuum conditions and under temperature conditions of 25° C. to 100° C., more preferably 40° C. to 80° C. until the organic solvent is removed.

At this time, as mentioned in to the step (2), when the solid electrolyte is a stand-alone solid electrolyte, after the composition for an electrolyte for a lithium secondary battery is dried, a step of separating the same from the support substrate is further included.

Meanwhile, when a solid electrolyte is coated on one surface of at least one of a negative electrode, a positive electrode, and a separator, the solid electrolyte is disposed on one surface of at least one of the negative electrode, the positive electrode and the separator, and thus, may be used immediately without having to be separated.

At this time, the thickness of the solid electrolyte prepared through the drying step may be controlled. The thickness of the film-type solid electrolyte is preferably as thin as possible in consideration of ion conductivity, but may be specifically 0.1 μm to 300 μm, more specifically 10 μm to 100 μm, even more specifically 10 μm to 50 μm.

When the thickness of the solid electrolyte is within the above range, the strength of the film may be maintained above a predetermined lever, the passage of a cation (Li+) and the like which is an ion transfer agent may be facilitated, and the deterioration in performance according to the total volume of a lithium secondary battery may be minimized. However, when an electrolyte to be finally prepared is a gel electrolyte, a solid electrolyte in a film form is formed to have a thickness of 2 μm or less, more preferably 20 nm to 2 μm.

Meanwhile, when a polymer represented by Formula 1 is used, after the step (3) or simultaneously and before the step (4), in order to cause a curing reaction for cross-linking the polymer represented by Formula 1, light such as a UV or a gamma ray may be applied (photo-curing), or heat may be further applied (thermal-curing).

For example, a photo-curing process may performed by exposure under a UV atmosphere from about 30 seconds to 10 minutes.

Alternatively, a thermal-curing process may be performed under an inert condition for 5 hours to 24 hours in a temperature range of 40° C. to 70° C.

When a curing process is performed under an inert atmosphere as described above, the reaction between oxygen and radicals in the atmosphere is fundamentally blocked to increase the extent of reaction of cross-linking to an extent that no unreacted polymer is present. Accordingly, it is possible to prevent the deterioration in mechanical strength and in ion transport capacity which is caused by polymer not participate in the cross-linking reaction but remaining inside the electrolyte.

For the inert atmosphere conditions, a gas having low reactivity known in the art may be used. Particularly, at least one inert gas selected from the group consisting of nitrogen, argon, helium and xenon may be used.

(4) Impregnating Coated Electrolyte in Non-Aqueous Electrolyte Solution

When preparing a gel electrolyte, after drying or drying and curing a composition for an electrolyte for a lithium secondary battery through the step (3), a step of impregnating the same in a non-aqueous electrolyte solution is further included.

Specifically, a dried composition for an electrolyte for a lithium secondary battery is impregnated in the non-aqueous electrolyte solution to prepare the composition in a gel electrolyte form in which solid-liquid phases are present together.

For example, the solid electrolyte is formed on one surface of one or more selected from a negative electrode, a positive electrode, and a separator, and then one or more of the negative electrode, the positive electrode, and the separator in which the solid electrolyte is formed is placed inside an electrode assembly, or a stand-alone solid electrolyte is placed inside an electrode assembly; and then received in a battery case. Thereafter, when a non-aqueous electrolyte solution is injected thereto to impregnate the solid electrolyte, the solid electrolyte is not dissolved in the non-aqueous electrolyte solution but swelled to form a gel electrolyte.

Lithium Secondary Battery

Meanwhile, the present invention provides a lithium secondary battery including the electrolyte for a lithium secondary battery. More specifically, the lithium secondary battery includes a positive electrode, a negative electrode, and an electrolyte, and further includes a separator if necessary. At this time, the electrolyte for a lithium secondary battery according to the present invention is disposed on one surface or both surfaces of at least of the positive electrode, the negative electrode, and the separator, or formed on one surface or both surfaces thereof. The electrolyte for a lithium secondary battery may be a solid electrolyte or a gel electrolyte.

First, a positive electrode will be described. The positive electrode may be manufactured by forming a positive electrode active material layer on a positive electrode current collector.

The positive electrode active material layer may be prepared by coating a positive electrode active material slurry including a positive electrode active material, a positive electrode binder, a positive electrode conductive material, and a solvent, followed by drying and roll-pressing.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The positive electrode active material is a compound capable of reversible intercalation and de-intercalation of lithium, and specifically, may include a lithium composite metal oxide containing one or more metals such as cobalt, manganese, nickel or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (wherein $0<Y<1$), $LiMn_{2-Z}Ni_ZO_4$ (wherein $0<Z<2$), etc.), a lithium-nickel-cobalt-based oxide (e.g., $LiNi_{1-Y1}Co_{Y1}O_2$ (wherein $0<Y1<1$), etc.), a lithium-manganese-cobalt-based oxide (e.g., $LiCo_{1-Y2}Mn_{Y2}O_2$ (wherein $0<Y2<1$), $LiMn_{2-z1}Co_{z1}O_4$ (wherein $0<Z1<2$, etc.), a lithium-nickel-manganese-cobalt-based oxide (e.g., $Li(Ni_pCo_qMn_{r1})O_2$ (wherein $0<p<1$, $0<q<1$, $0<r1<1$, $p+q+r1=1$) or $Li(Ni_{p1}Co_{q1}Mn_{r2})O_4$ (wherein $0<p1<2$, $0<q1<2$, $0<r2<2$, $p1+q1+r2=2$, etc.), or a lithium-nickel-cobalt-transition metal (M) oxide (e.g., $Li(Ni_{p2}Co_{q2}Mn_{r3}A_{s2})O_2$ (wherein A is selected from the group consisting of Al, Fe, V, Cr, Ti, Ta, Mg, and Mo, and p2, q2, r3, and s2 are each an atomic fraction of stand-alone elements, and $0<p2<1$, $0<q2<1$, $0<r3<1$, $0<s2<1$, $p2+q2+r3+s2=1$, etc.) and the like, and any one thereof or a compound of two or more thereof may be included.

Among these, due to the fact that the capacity properties and stability of a battery may be increased, the lithium composite metal oxide may be $LioCO_2$, $LiMnO_2$, $LiNiO_2$, a lithium nickel-manganese-cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, etc.), or a lithium nickel cobalt aluminum oxide (e.g., $Li(Ni_{0.8}Co_{0.15}Al_{0.05})O_2$, etc.).

The positive electrode active material may be included in an amount of 70 wt % to 98 wt %, specifically 80 wt % to 98 wt % based on the total weight of solids of a positive electrode active material slurry. At this time, when the content of the positive electrode active material is 70 wt % or less, energy density is lowered, and thus, the capacity may be lowered.

The positive electrode binder is a component to assist in bonding of a positive electrode active material and a positive electrode conductive material, and in bonding to a current collector, and is typically added in an amount of 1 to 15 wt %, specifically 1 wt % to 10 wt % based on the total weight of solids of a positive electrode active material slurry. Examples of the positive electrode binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, fluorine rubber, various copolymers thereof, and the like.

The positive electrode conductive material is typically added in an amount of 1 to 15 wt %, specifically 1 wt % to 10 wt % based on the total weight of solids of a positive electrode active material slurry.

The positive electrode conductive material is not particularly limited as long as it has conductivity without causing a chemical change in the battery. Examples of the conductive material may include carbon powder such as carbon black, acetylene black, Ketjen black, channel black, furnace black, lamp black, or thermal black; graphite powder having a very developed crystal structure such as natural graphite, artificial graphite, or graphite; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like. As the positive electrode conductive material, a commercially available conductive material may be used under the titles of acetylene black series (Chevron Chemical Company), Denka black (Denka Singapore Private Limited, products of Gulf Oil Company, Ketjen black, EC series (Armak Company), Vulcan XC-72 (Cabot Company), and Super P (Timcal company).

The solvent may include N-methyl-2-pyrrolidone (NMP), and may be used in an amount such that a preferred viscosity is achieved when the positive electrode active material, and selectively, a positive electrode binder and a positive electrode conductive material, and the like are included. For example, the solvent may be included in an amount such that the concentration of solids including the positive electrode active material, and selectively the positive electrode binder and the positive electrode conductive material is 80 wt % to 99 wt %, preferably 85 wt % to 99 wt %.

The negative electrode may be manufactured by forming a negative electrode active material layer on a negative electrode current collector. The negative electrode active material layer may be prepared by coating a negative electrode active material slurry including a negative electrode active material, a negative electrode binder, a negative electrode conductive material, and a solvent, followed by drying and roll-pressing. Meanwhile, as the negative electrode, a metal negative electrode current collector or a carbon negative electrode current collector itself may be used.

The negative electrode current collector typically has a thickness of 3 μm to 500 μm. The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the coupling force of a negative electrode active material, and the negative electrode current collector may be used in various forms of such as a film, a sheet, a foil, a net, a porous body, a foam body, and a non-woven fabric body.

In addition, the negative electrode active material may include at least one selected from the group consisting of a carbon material capable of reversible intercalation/de-intercalation of lithium metals and lithium ions, a material capable of doping and undoping a metal or an alloy of the metal and lithium, a metal composite oxide, and lithium, and a transition metal oxide.

As the carbon material capable of reversible intercalation/de-intercalation of lithium metals, a carbon-based negative electrode active material commonly used in a lithium ions may be used without particular limitation, and examples thereof may include a crystalline carbon, an amorphous carbon, or a combination thereof. Examples of the crystalline carbon may include graphite such as an irregular, planar, flaky, spherical, or fibrous natural graphite or artificial graphite, and examples of the amorphous carbon may include soft carbon (low-temperature fired carbon) or hard carbon, mezophase pitch carbides, fired cokes, and the like.

As the metal or the alloy of the metal and lithium, a metal selected from the group consisting of Cu, Ni, Na, K, Rb, Cs, Fr, Be, Mg, Ca, Sr, Sb, Pb, In, Zn, Ba, Ra, Ge, Al, and Sn, or an alloy of the metal and lithium may be used.

As the metal composite oxide, one selected from the group consisting of $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, $Li_{x1}Fe_2O_3$ ($0 \leq x1 \leq 1$), $Li_{x2}WO_2$ ($0 \leq x2 \leq 1$), and $Sn_xMe_{1-x3}Me'_{y3}O_{z2}$ (Me: Mn, Fe, Pb, Ge; Me': an element each in Group, Group 2, and Group 3 of the periodic table, halogen: $0 < x3 \leq 1$; $1 \leq y3 \leq 3$; $1 \leq z2 \leq 8$).

The material capable of doping and undoping lithium may be an element selected from the group consisting of Si, $SiO_{x4}$ ($0 < x4 < 2$), an Si alloy (a metal included in the ally is an element selected from the group consisting of an alkali metal, an alkaline earth metal, a Group 13 element, a Group 14 element, a transition metal, a rare earth element and a combination thereof, but not Si), Sn, $SnO_2$, an Sn alloy (a metal included in the alloy is an element selected from the group consisting of an alkali metal, an alkaline earth metal, a Group 13 element, a Group 14 element, a transition metal, a rare earth element and a combination thereof, but not Sn), and the like, or at least one thereof may be mixed with $SiO_2$ and used. The metal included in the alloy may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may be a lithium-containing titanium composite oxide (LTO), a vanadium oxide, a lithium vanadium oxide, and the like.

The negative electrode active material may be included in an amount of 70 wt % to 98 wt %, specifically 80 wt % to 98 wt % based on the total weight of solids of a negative electrode active material slurry.

The negative electrode binder is a component to assist in bonding of a negative electrode conductive material and a negative electrode active material, and a negative current collector, and is typically added in an amount of 1 to 15 wt %, specifically 1 wt % to 10 wt % based on the total weight of solids of a negative electrode active material slurry.

Examples of the negative electrode binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, fluorine rubber, various copolymers thereof, and the like.

The negative electrode conductive material is a component for further improving the conductivity of a negative electrode active material, and may be added in an amount of 1 wt % to 15 wt %, specifically 1 wt % to 10 wt % based on the total weight of solids of a negative electrode active material slurry. The negative electrode conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; a metal oxide such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The solvent may include water or N-methyl-2-pyrrolidone (NMP), alcohol, and the like, and may be used in an amount such that a preferred viscosity is achieved when the negative electrode active material, and selectively, a negative electrode binder and a negative electrode conductive material, and the like are included. For example, the solvent may be included in an amount such that the concentration of solids including the positive electrode active material, and selectively the binder and the conductive material is 80 wt % to 99 wt %, preferably 85 wt % to 99 wt %.

In addition, the lithium secondary battery of the present invention may further include a separator if necessary.

The separator serves to block internal short circuit in both electrodes and to impregnate an electrolyte, and may be formed by first preparing a separator composition by mixing a polymer resin, a filler and a solvent, and then coating the separator composition directly on an upper portion of an electrode followed by drying to form a separator film, or casting the separator composition on a support followed by drying, and laminating a separator film de-laminated from the support on the upper portion of the electrode.

As the separator, a porous polymer film typically used as a separator, for example, a porous polymer film prepared with a polyolefin-based polymer, such as an ethylene homopolymer, a propylene homopolymer, an ethylene-butene copolymer, an ethylene-hexene copolymer, and an ethylene-methacrylate copolymer may be used alone, or in a laminated form thereof. Alternatively, a typical porous non-woven fabric, for example, a non-woven fabric formed of a glass fiber having a high melting point or polyethylene terephthalate fiber may be used, but the present invention is not limited thereto.

At this time, the pore diameter of the porous separator is typically 0.01 μm to 50 μm, and the porosity thereof may be 5% to 95%. In addition, the thickness of the porous separator may typically be in the range of 5 μm to 300 μm.

MODE FOR CARRYING OUT THE INVENTION

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

I. Solid Electrolyte for Lithium Secondary Battery and Lithium Secondary Battery 1. Example 1

(1) Manufacturing Electrode 94 wt % of a $LiCoO_2$ compound of 4.2 V level as a positive electrode active material, 4 wt % of carbon black as a conductive material, and 2 wt % of polyvinylidene fluoride (PVDF) as a binder were added to N-methyl-2-pyrrolidone (hereinafter, NMP) which is a solvent to prepare a positive electrode active material slurry (solid content 90 wt %).

The positive electrode active material slurry was applied on the surface of an aluminum (Al) thin film having a thickness of 20 μm, and then dried to prepare a positive electrode plate on which a positive electrode active material layer is formed.

A lithium metal was applied on a Cu thin film, and then roll-pressed to prepare a negative electrode plate having a thickness of 20 μm.

(2) Preparing Solid Electrolyte for Lithium Secondary Battery

To 90 g of an organic solvent (NMP), 4 g of a polymer represented by Formula 1b (weight average molecular weight (Mw)=50,000, a2=380, b2=380, c2=380), 6 g of an inorganic solid electrolyte particle (LLZO) were introduced, followed by further introducing 0.08 g of 2-hydroxy-2-methylpropiophenone (HMPP) as a photo-curing agent thereto and stirring to prepare a composition for an electrolyte for a lithium secondary battery. Thereafter, the composition for an electrolyte for a lithium secondary battery was applied on one surface of the negative electrode plate, dried to remove all the organic solvent (NMP), and cured by being exposed in a UV atmosphere for 2 minutes to form a solid electrolyte having a thickness of 50 μm on the negative electrode plate.

(3) Manufacturing Lithium Secondary Battery

The manufactured positive electrode and the negative electrode on which a solid electrolyte is formed were sequentially laminated such that the solid electrolyte faces the positive electrode to manufacture an electrode assembly. Thereafter, the electrode assembly was received in a pouch-type battery case to manufacture a lithium secondary battery of a 4.2 V level.

2. Example 2

A solid electrolyte for a lithium secondary battery and a lithium secondary battery including the same were manufactured in the same manner as in Example 1 except that when preparing the solid electrolyte for a lithium secondary battery, 6 g of LGPS ($Li_{10}GeP_2S_{12}$) was introduced into the composition for an electrolyte for a lithium secondary battery instead of LLZO as an inorganic solid electrolyte particle.

3. Example 3

A solid electrolyte for a lithium secondary battery and a lithium secondary battery including the same were manufactured in the same manner as in Example 1 except that when preparing the solid electrolyte for a lithium secondary battery, 6 g of $BaTiO_3$ was introduced as a ferrodielectric into the composition for an electrolyte for a lithium secondary battery instead of an inorganic solid electrolyte particle (LLZO).

4. Example 4

A solid electrolyte for a lithium secondary battery and a lithium secondary battery including the same were manufactured in the same manner as in Example 1 except that when preparing the solid electrolyte for a lithium secondary battery, 4 g of a polymer (weight average molecular weight (Mw)=100,000) represented by Formula 1c was introduced instead of the polymer represented by Formula 1b.

5. Example 5

A solid electrolyte for a lithium secondary battery and a lithium secondary battery including the same were manufactured in the same manner as in Example 4 except that when preparing the solid electrolyte for a lithium secondary battery, 1 wt % of TEPi was further introduced as an oxygen inhibitor to the composition for an electrolyte for a lithium secondary battery.

6. Example 6

When preparing the solid electrolyte for a lithium secondary battery, to 99 g of an organic solvent (NMP), 1 g of a polymer including a repeating unit represented by Formula 2a-2 (weight average molecular weight (Mw)=100,000, m12=600, n12=150, m12:n12=4:1) and 1.5 g of an inorganic solid electrolyte particle (LLZO) were introduced, followed stirring to prepare a composition for an electrolyte for a lithium secondary battery. Thereafter, the composition for an electrolyte for a lithium secondary battery was applied on one surface of the negative electrode plate, and all the organic solvent (NMP) was removed to form a solid electrolyte having a thickness of 30 μm on the negative electrode plate.

7. Example 7

A solid electrolyte for a lithium secondary battery and a lithium secondary battery including the same were manufactured in the same manner as in Example 6 except that when preparing the solid electrolyte for a lithium secondary battery, 1.5 g of LGPS ($Li_{10}GeP_2S_{12}$) was introduced into the composition for an electrolyte for a lithium secondary battery instead of LLZO as an inorganic solid electrolyte.

8. Example 8

A solid electrolyte for a lithium secondary battery and a lithium secondary battery including the same were manufactured in the same manner as in Example 6 except that when preparing the solid electrolyte for a lithium secondary battery, 1.5 g of $BaTiO_3$ was introduced as a ferrodielectric into the composition for an electrolyte for a lithium secondary battery instead of an inorganic solid electrolyte particle (LLZO).

9. Example 9

A solid electrolyte for a lithium secondary battery and a lithium secondary battery including the same were manufactured in the same manner as in Example 6 except that 1 g of a polymer including a repeating unit represented by Formula 2a-3 (weight average molecular weight (Mw)=50,000, m13=320, n13=80, m13:n13=4:1) was introduced instead of the polymer including a repeating unit represented by 2a-2.

10. Example 10

A solid electrolyte for a lithium secondary battery and a lithium secondary battery including the same were manufactured in the same manner as in Example 6 except that when preparing the solid electrolyte for a lithium secondary battery, 4 g of an inorganic solid electrolyte particle LLZO was introduced into the composition for an electrolyte for a lithium secondary battery.

11. Example 11

A solid electrolyte for a lithium secondary battery and a lithium secondary battery including the same were manufactured in the same manner as in Example 6 except that when preparing the solid electrolyte for a lithium secondary battery, 4 g of an inorganic solid electrolyte particle LGPS was introduced into the composition for an electrolyte for a lithium secondary battery.

12. Example 12

A solid electrolyte for a lithium secondary battery and a lithium secondary battery including the same were manufactured in the same manner as in Example 8 except that, when preparing the solid electrolyte for a lithium secondary battery, 4 g of a ferrodielectric $BaTiO_3$ was introduced into the composition for an electrolyte for a lithium secondary battery.

13. Comparative Example 1

A solid electrolyte for a lithium secondary battery and a lithium secondary battery including the same were manufactured in the same manner as in Example 1 except that 4 g of a linear polyethylene oxide copolymer (L-PEO, weight average molecular weight (Mw)=100,000) was used instead of the polymer represented by Formula 1b.

14. Comparative Example 2

When preparing the solid electrolyte for a lithium secondary battery, to 90 g of an organic solvent (NMP), 10 g of a polymer represented by Formula 1b was introduced, followed by further introducing 0.08 g of 2-hydroxy-2-methylpropiophenone (HMPP) as a photo-curing agent thereto and stirring to prepare a composition for an electrolyte for a lithium secondary battery.

15. Comparative Example 3

A solid electrolyte for a lithium secondary battery and a lithium secondary battery including the same were manufactured in the same manner as in Example 6 except that 1 g of a linear polyethylene glycol copolymer (L-PEO, weight average molecular weight (Mw)=100,000) was used instead of the polymer including a repeating unit represented by Formula 2a-2.

16. Comparative Example 4

A solid electrolyte for a lithium secondary battery and a lithium secondary battery including the same were manufactured in the same manner as in Example 6 except that 1.5 g of an organic solid electrolyte particle LLZO was not introduced to the composition for an electrolyte for a lithium secondary battery.

II. Gel Electrolyte for Lithium Secondary Battery and Lithium Secondary Battery

1. Example 13

(1) Manufacturing Electrode 94 wt % of a $LiCoO_2$ compound of 4.2 V level as a positive electrode active material, 4 wt % of carbon black as a conductive material, and 2 wt % of PvDF as a binder component were added to N-methyl-2-pyrrolidone (NMP) which is a solvent to prepare a positive electrode active material slurry (solid content 90 wt %).

The positive electrode active material slurry was applied on the surface of an aluminum (Al) thin film having a thickness of 20 μm, and then dried to prepare a positive electrode plate on which a positive electrode active material layer is formed.

A lithium metal was applied on a Cu thin film, and then roll-pressed to prepare a negative electrode plate having a thickness of 20 μm.

(2) Manufacturing Lithium Secondary Battery

To 95 g of NMP, 2 g of a polymer represented by Formula 1b (weight average molecular weight (Mw)=50,000, a2=380, b2=380, c2=380), 3 g of an inorganic solid electrolyte particle (LLZO) were introduced, followed by further introducing 0.04 g of 2-hydroxy-2-methylpropiophenone (HMPP) as a photo-curing agent thereto and stirring to prepare a composition for an electrolyte for a lithium secondary battery. Thereafter, the composition for an electrolyte was applied on one surface of the negative electrode plate, dried to remove all the organic solvent (NMP), and cured by being exposed in a UV atmosphere for 2 minutes to form a solid electrolyte having a thickness of 1 μm on the negative electrode plate.

The positive electrode/polyolefin-based separator (thickness: 20 μm)/negative electrode on which a solid electrolyte is formed were sequentially laminated to manufacture an electrode assembly. Thereafter, the electrode assembly was received in a pouch-type battery case.

Thereafter, 500 μl of a non-aqueous organic solvent in which 1 M of $LiPF_6$ is dissolved (FEC:EMC=3:7 vol %) was injected to manufacture a lithium secondary battery (full cell) of a 4.2 V level including a gel electrolyte for a lithium secondary battery formed by impregnating the solid electrolyte to the non-aqueous electrolyte solution.

2. Example 14

A gel electrolyte for a lithium secondary battery and a lithium secondary battery including the same were manufactured in the same manner as in Example 13 except that 3 g of LGPS ($Li_{10}GeP_2S_{12}$) was introduced into the composition for an electrolyte for a lithium secondary battery instead of LLZO as an inorganic solid electrolyte particle.

3. Example 15

A gel electrolyte for a lithium secondary battery and a lithium secondary battery including the same were manufactured in the same manner as in Example 13 except that 3 g of $BaTiO_3$ was introduced as a ferrodielectric into the composition for an electrolyte for a lithium secondary battery instead of an inorganic solid electrolyte particle (LLZO).

4. Example 16

A gel electrolyte for a lithium secondary battery and a lithium secondary battery including the same were manufactured in the same manner as in Example 13 except that 2 g of a polymer (weight average molecular weight (Mw)=100,000) represented by Formula 1c was introduced instead of the polymer represented by Formula 1b.

5. Example 17

A gel electrolyte for a lithium secondary battery and a lithium secondary battery including the same were manufactured in the same manner as in Example 13 except that 1 wt % of TEPi was further introduced as an oxygen inhibitor to the composition for an electrolyte for a lithium secondary battery.

6. Example 18

A gel electrolyte for a lithium secondary battery and a lithium secondary battery including the same were manufactured in the same manner as in Example 13 except that 100 μl of an ionic liquid (Pyr13-FSI) was further introduced after the non-aqueous electrolyte solution was injected.

7. Example 19

To 99 g of NMP, 1 g of a polymer including a repeating unit represented by Formula 2a-2 (weight average molecular weight (Mw)=100,000, m12=600, n12=150, m12:n12=4:1) and 1.5 g of an inorganic solid electrolyte particle (LLZO) were introduced, followed stirring to prepare a composition for an electrolyte for a lithium secondary battery. Thereafter, the composition for an electrolyte for a lithium secondary battery was applied on one surface of the negative electrode plate, and all the organic solvent (NMP) was removed to form a solid electrolyte having a thickness of 1.0 μm on the negative electrode plate.

The manufactured positive electrode, negative electrode including a solid electrolyte, and polyolefin-based separator (thickness: 20 μm) were sequentially laminated to manufacture an electrode assembly. Thereafter, the electrode assembly was received in a pouch-type battery case.

Thereafter, 700 μl of a non-aqueous organic solvent in which 1 M of $LiPF_6$ is dissolved (FEC:EMC=3:7 vol %) was injected to manufacture a lithium secondary battery (full cell) of a 4.2 V level including a gel electrolyte for a lithium secondary battery formed by impregnating the solid electrolyte to the non-aqueous electrolyte solution.

8. Example 20

A gel electrolyte for a lithium secondary battery and a lithium secondary battery including the same were manufactured in the same manner as in Example 19 except that 1.5 g of LGPS was introduced as an inorganic solid electrolyte particle instead of LLZO.

9. Example 21

A gel electrolyte for a lithium secondary battery and a lithium secondary battery including the same were manufactured in the same manner as in Example 19 except that 1.5 g of $BaTiO_3$ was introduced as a ferrodielectric into the composition for an electrolyte for a lithium secondary battery instead of 1.5 g of an inorganic solid electrolyte particle LLZO.

10. Example 22

A gel electrolyte for a lithium secondary battery and a lithium secondary battery including the same were manufactured in the same manner as in Example 19 except that 1 g of a polymer including a repeating unit represented by Formula 2a-3 (weight average molecular weight (Mw)=50,000, m13=320, n13=80, m13:n13=4:1) was introduced instead of the polymer including a repeating unit represented by 2a-2 (weight average molecular weight (Mw)=100,000, m12=600, n12=150, m12:n12=4:1).

11. Example 23

A gel electrolyte for a lithium secondary battery and a lithium secondary battery including the same were manufactured in the same manner as in Example 19 except that 4 g of an inorganic solid electrolyte particle LLZO was introduced to the composition for an electrolyte for a lithium secondary battery.

12. Example 24

A gel electrolyte for a lithium secondary battery and a lithium secondary battery including the same were manufactured in the same manner as in Example 19 except that 4 g of an inorganic solid electrolyte particle LGPS was introduced to the composition for an electrolyte for a lithium secondary battery.

13. Example 25

A gel electrolyte for a lithium secondary battery and a lithium secondary battery including the same were manufactured in the same manner as in Example 19 except that 4 g of $BaTiO_3$ was introduced as a ferrodielectric to the composition for an electrolyte for a lithium secondary battery.

14. Example 26

A gel electrolyte for a lithium secondary battery and a lithium secondary battery including the same were manufactured in the same manner as in Example 19 except that when manufacturing a lithium secondary battery in Example 19, 140 μl of an ionic liquid (Pyr13-FSI) was further introduced after the non-aqueous electrolyte solution was injected.

15. Comparative Example 5

A gel electrolyte for a lithium secondary battery and a lithium secondary battery including the same were manufactured in the same manner as in Example 13 except that 2 g of a linear polyethylene oxide copolymer (L-PEO, weight average molecular weight (Mw)=100,000) was used for the composition for an electrolyte for a lithium secondary battery instead of the polymer represented by Formula 1b.

16. Comparative Example 6

A gel electrolyte for a lithium secondary battery and a lithium secondary battery including the same were manufactured in the same manner as in Example 13 except that to 95 g of an organic solvent (NMP), 5 g of a polymer represented by Formula 1b was introduced (weight average molecular weight (Mw)=50,000, a2=380, b2=380, c2=380), followed by further introducing 0.04 g of 2-hydroxy-2-methylpropiophenone (HMPP) as a photo-curing agent thereto and stirring to prepare a composition for an electrolyte for a lithium secondary battery.

17. Comparative Example 7

A gel electrolyte for a lithium secondary battery and a lithium secondary battery including the same were manufactured in the same manner as in Example 19 except that 1 g of a linear polyethylene glycol copolymer (L-PEO, weight average molecular weight (Mw)=100,000) was used for the composition for an electrolyte for a lithium secondary battery instead of the polymer including a repeating unit represented by Formula 2a-2.

18. Comparative Example 8

A gel electrolyte for a lithium secondary battery and a lithium secondary battery including the same were manufactured in the same manner as in Example 19 except that 1.5 g of an inorganic solid electrolyte particle LLZO was not introduced to the composition for an electrolyte for a lithium secondary battery.

EXPERIMENTAL EXAMPLES

1. Experimental Example 1. Evaluation of Mechanical Strength of Solid Electrolyte for Lithium Secondary Battery The solid electrolyte for a lithium secondary battery prepared in each of Examples 1 to 12, and the solid electrolyte for a lithium secondary battery prepared in each of Comparative Examples 1 to 4 were subjected to a mechanical strength test through the measurement of tensile strength.

At this time, electrolyte specimens were prepared using ASTM standard D638 (Type V specimens) and the tensile strength was measured at 25° C., at a rate of 5 mm per minute, and at a relative humidity of about 30% through Lloyd LR-10K. The results are shown in Table 1 below.

TABLE 1

|  | Tensile strength (MPa) |
| --- | --- |
| Example 1 | 15.7 |
| Example 2 | 13.8 |
| Example 3 | 14.1 |
| Example 4 | 18.9 |
| Example 5 | 22.5 |
| Example 6 | 12.9 |
| Example 7 | 13.1 |

TABLE 1-continued

| | Tensile strength (MPa) |
|---|---|
| Example 8 | 10.2 |
| Example 9 | 9.5 |
| Example 10 | 10.6 |
| Example 11 | 10.1 |
| Example 12 | 8.2 |
| Comparative Example 1 | 4.6 |
| Comparative Example 2 | 9.8 |
| Comparative Example 3 | 4.6 |
| Comparative Example 4 | 2.8 |

Referring to Table 1, the tensile strength of the solid electrolyte for a lithium secondary battery prepared according to each of Examples is higher than that of the solid electrolyte for a lithium secondary battery prepared according to each of Comparative Examples.

2. Experimental Example 2. Evaluation of Ion Conductivity of Electrolyte for Lithium Secondary Battery A gold (Au) electrode was coated in a circular form with a diameter of 1 mm using a sputtering method on an upper portion of the electrolytes prepared according to each of Examples and Comparative Examples, and ion conductivity was measured at 25° C. using an alternating current impedance measurement method. The ion conductivity was measured using a VMP3 measurement device and 4294A at a frequency band of 100 MHz to 0.1 Hz. The measurement results are shown in Table 2 below.

TABLE 2

| | Ion conductivity (S/cm) |
|---|---|
| Example 1 | $6.7 \times 10^{-5}$ |
| Example 2 | $7.7 \times 10^{-5}$ |
| Example 3 | $7.2 \times 10^{-5}$ |
| Example 4 | $4.9 \times 10^{-5}$ |
| Example 5 | $4.3 \times 10^{-5}$ |
| Example 6 | $8.9 \times 10^{-5}$ |
| Example 7 | $8.6 \times 10^{-5}$ |
| Example 8 | $7.1 \times 10^{-5}$ |
| Example 9 | $9.2 \times 10^{-5}$ |
| Example 10 | $9.6 \times 10^{-5}$ |
| Example 11 | $9.4 \times 10^{-5}$ |
| Example 12 | $7.1 \times 10^{-5}$ |
| Example 13 | $2.8 \times 10^{-4}$ |
| Example 14 | $3.2 \times 10^{-4}$ |
| Example 15 | $3.0 \times 10^{-4}$ |
| Example 16 | $2.8 \times 10^{-4}$ |
| Example 17 | $2.7 \times 10^{-4}$ |
| Example 18 | $2.9 \times 10^{-4}$ |
| Example 19 | $4.6 \times 10^{-4}$ |
| Example 20 | $5.1 \times 10^{-4}$ |
| Example 21 | $3.2 \times 10^{-4}$ |
| Example 22 | $4.8 \times 10^{-4}$ |
| Example 23 | $5.2 \times 10^{-4}$ |
| Example 24 | $5.3 \times 10^{-4}$ |
| Example 25 | $3.5 \times 10^{-4}$ |
| Example 26 | $4.1 \times 10^{-4}$ |
| Comparative Example 1 | $1.8 \times 10^{-6}$ |
| Comparative Example 2 | $2.9 \times 10^{-5}$ |
| Comparative Example 3 | $3.5 \times 10^{-6}$ |
| Comparative Example 4 | $1.8 \times 10^{-6}$ |
| Comparative Example 5 | $1.4 \times 10^{-4}$ |
| Comparative Example 6 | $1.7 \times 10^{-4}$ |
| Comparative Example 7 | $8.6 \times 10^{-5}$ |
| Comparative Example 8 | $7.7 \times 10^{-5}$ |

Referring to Table 2, the electrolyte according to each of Examples 1 to 5 has a higher ion conductivity than the electrolyte according to each of Comparative Examples 1 and 2, and the electrolyte according to each of Examples 13 to 18 has a higher ion conductivity than the electrolyte according to each of Comparative Examples 4 and 5. Meanwhile, the electrolyte according to each of Examples 6 to 10 has a higher ion conductivity than the electrolyte according to each of Comparative Examples 3 and 4, and the electrolyte according to each of Examples 19 to 26 has a higher ion conductivity than the electrolyte according to each of Comparative Examples 7 and 8.

3. Experimental Example 3. Evaluation of Capacity Retention Rate of Lithium Secondary Battery at Room Temperature The lithium secondary battery manufactured according to each of Examples and Comparative Examples was subjected to formation, and charged/discharged once at a charge/discharge rate of 0.2 C/0.5 C under a temperature condition of room temperature (25° C.), respectively. At this time, the first charge/discharge state was defined as the initial charge, and the number of cycles (n) at the time when the capacity retention rate with respect to the initial capacity was maintained at 80% was measured. The values are respectively shown in Table 3 below.

TABLE 3

| | Number of cycles (n) |
|---|---|
| Example 1 | 48 |
| Example 2 | 39 |
| Example 3 | 45 |
| Example 4 | 52 |
| Example 5 | 56 |
| Example 6 | 56 |
| Example 7 | 54 |
| Example 8 | 48 |
| Example 9 | 62 |
| Example 10 | 59 |
| Example 11 | 59 |
| Example 12 | 44 |
| Example 13 | 124 |
| Example 14 | 120 |
| Example 15 | 107 |
| Example 16 | 116 |
| Example 17 | 119 |
| Example 18 | 106 |
| Example 19 | 92 |
| Example 20 | 85 |
| Example 21 | 82 |
| Example 22 | 95 |
| Example 23 | 80 |
| Example 24 | 81 |
| Example 25 | 80 |
| Example 26 | 87 |
| Comparative Example 1 | 10 |
| Comparative Example 2 | 22 |
| Comparative Example 3 | 22 |
| Comparative Example 4 | 20 |
| Comparative Example 5 | 35 |
| Comparative Example 6 | 41 |
| Comparative Example 7 | 45 |
| Comparative Example 8 | 40 |

Referring to Table 3, the lithium secondary battery according to each of Examples 1 to 5 has a higher cycle number than the lithium secondary battery according to each of Comparative Examples 1 and 2, and the lithium secondary battery according to each of Examples 13 to 18 has a higher cycle number than the lithium secondary battery according to each of Comparative Examples 4 and 5. Meanwhile, the lithium secondary battery according to each of Examples 6 to 1 has a higher cycle number than the lithium secondary battery according to each of Comparative Examples 3 and 4, and the lithium secondary battery according to each of Examples 19 to 26 has a higher cycle number than the lithium secondary battery according to each of Comparative Examples 7 and 8.

4. Experimental Example 4. Evaluation of High Temperature (45° C.) Capacity Retention Rate of Lithium Secondary Battery The lithium secondary battery manufactured according to each of Examples and Comparative Examples was subjected to formation, and charged/discharged once at a charge/discharge rate of 0.2 C/0.5 C at 45° C., respectively. At this time, the first charge/discharge state was defined as the initial charge, and the number of cycles (n) at the time when the capacity retention rate with respect to the initial capacity was maintained at 80% was measured. The values are respectively shown in Table 4 below.

TABLE 4

| | Number of cycles (n) |
|---|---|
| Example 1 | 71 |
| Example 2 | 60 |
| Example 3 | 65 |
| Example 4 | 75 |
| Example 5 | 67 |
| Example 6 | 63 |
| Example 7 | 60 |
| Example 8 | 60 |
| Example 9 | 67 |
| Example 10 | 77 |
| Example 11 | 74 |
| Example 12 | 70 |
| Example 13 | 138 |
| Example 14 | 129 |
| Example 15 | 116 |
| Example 16 | 121 |
| Example 17 | 140 |
| Example 18 | 138 |
| Example 19 | 121 |
| Example 20 | 118 |
| Example 21 | 107 |
| Example 22 | 122 |
| Example 23 | 106 |
| Example 24 | 102 |
| Example 25 | 97 |
| Example 26 | 116 |
| Comparative Example 1 | 16 |
| Comparative Example 2 | 20 |
| Comparative Example 3 | 20 |
| Comparative Example 4 | 16 |
| Comparative Example 5 | 12 |
| Comparative Example 6 | 18 |
| Comparative Example 7 | 15 |
| Comparative Example 8 | 12 |

Referring to Table 4, the lithium secondary battery according to each of Examples has a higher cycle number than the lithium secondary battery according to each of Comparative Examples under high temperature conditions.

5. Experimental Example 5: High-Temperature Electrochemical Stability Test

The lithium secondary battery manufactured in each of Examples 6 to 12 and Comparative Examples 3 and 4 were measured for oxidation starting voltage at a high temperature (60° C.) using a linear sweep voltammetry (LSV) method or a cyclic voltammetry method up to 8 V.

The results are shown in Table 5 below.

TABLE 5

| | High-temperature oxidation stability (V) @ 60° C. |
|---|---|
| Example 6 | 5.5 |
| Example 7 | 5.4 |
| Example 8 | 5.7 |
| Example 9 | 5.2 |
| Example 10 | 6.2 |
| Example 11 | 5.9 |
| Example 12 | 6.7 |
| Comparative Example 3 | 4.9 |
| Comparative Example 4 | 4.6 |

As shown in Table 5, all of the lithium secondary batteries manufactured in Examples 6 to 12 exhibited an oxidation starting voltage at about 5.0 V or higher, so that it can be confirmed that the electrochemical (oxidation) safety thereof at high temperatures is high. On the contrary, in the case of the lithium secondary batteries manufactured in Comparative Examples 3 and 4, the oxidation starting voltage thereof was all lower than 5.0 V, so that it can be confirmed that the electrochemical (oxidation) safety thereof at high temperatures is lower than that of the lithium secondary batteries according to Examples.

The invention claimed is:

1. An electrolyte for a lithium secondary battery, comprising:
a polymer; and
one or more selected from the group consisting of an inorganic solid electrolyte particle and a ferrodielectric, wherein the polymer includes one or more selected from the group consisting of a polymer represented by Formula 1 below and a polymer including a repeating unit represented by Formula 2 below:

[Formula 1]

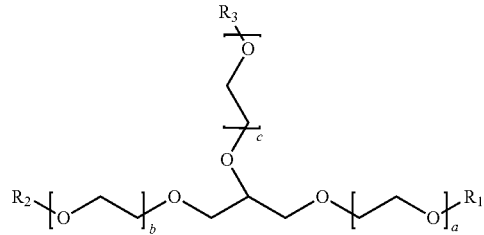

in Formula 1 above, $R_1$, $R_2$, and $R_3$ are each independently hydrogen or —$CH_2$—CH=$CH_2$, wherein at least one of the $R_1$, $R_2$, or $R_3$ is —$CH_2$—CH=$CH_2$, and a, b, and c are each independently an integer of 1 to 10,000,

[Formula 2]

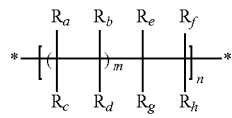

in Formula 2 above, $R_a$ to $R_d$ are each independently an element selected from the group consisting of H, F, Cl, Br, and I, $R_e$ to $R_h$ are each independently one selected from the group consisting of H, F, Cl, Br, and *—$OR_0SO_3^-M^+$, and at least one of the $R_e$ to $R_h$ is

*—$OR_0SO_3^-M^+$, wherein $R_0$ is —$CH(CF_3)CF_2$— or —$CF(CF_3)$ and $M^+$ is one selected from the group consisting of $H^+$, $Li^+$, $Na^+$, and $K^+$, and m and n are each independently an integer of 1 to 10,000.

2. The electrolyte for a lithium secondary battery of claim 1, wherein the polymer represented by Formula 1 is at least one selected from the group consisting of polymers represented by Formulas 1a to 1c:

[Formula 1a]

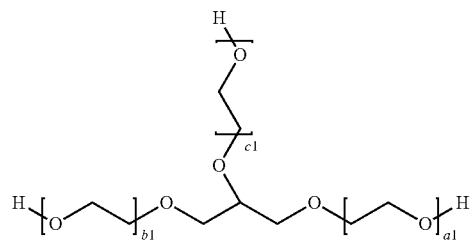

in Formula 1a above, a1, b1, and c1 are each independently an integer of 1 to 10,000,

[Formula 1b]

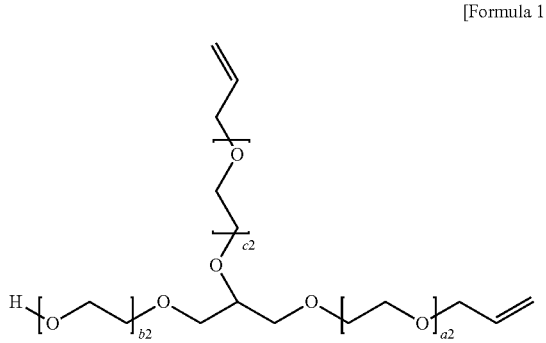

in Formula 1b above, a2, b2, and c2 are each independently an integer of 1 to 10,000,

[Formula 1c]

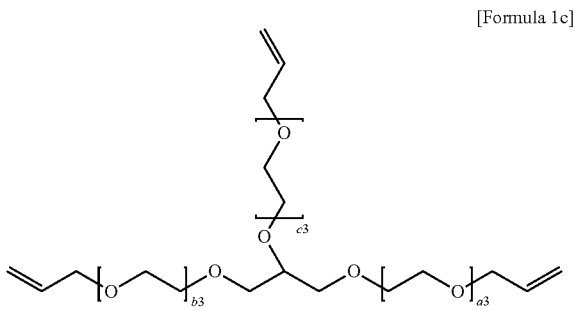

in Formula 1c above, a3, b3, and c3 are each independently an integer of 1 to 10,000.

3. The electrolyte for a lithium secondary battery of claim 1, wherein the repeating unit represented by Formula 2 is at least one selected from the group consisting of repeating units represented by Formula 2a and Formula 2b:

[Formula 2a]

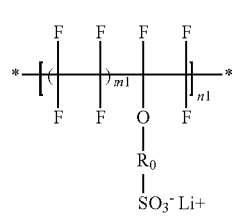

in Formula 2a above, m1 and n1 are each independently an integer of 1 to 10,000, and $R_0$ is —$CH(CF_3)CF_2$— or —$CF(CF_3)$,

[Formula 2b]

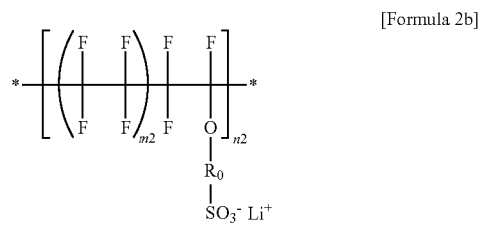

in Formula 2b above, m2 and n2 are each independently an integer of 1 to 10,000, and $R_0$ is —$CH(CF_3)CF_2$— or —$CF(CF_3)$.

4. The electrolyte for a lithium secondary battery of claim 3, wherein in Formula 2a and Formula 2b, a molar ratio of m1:n1 and a molar ratio of m2:n2 are 1:1 to 10:1, respectively.

5. The electrolyte for a lithium secondary battery of claim 3, wherein in Formula 2a and Formula 2b, $R_0$ is —$CH(CF_3)CF_2$.

6. The electrolyte for a lithium secondary battery of claim 1, wherein the polymer represented by Formula 1 is cross-linked using one or more curing agents selected from the group consisting of a photo-curing agent and a thermal curing agent.

7. The electrolyte for a lithium secondary battery of claim 1, wherein, in the repeating unit represented by Formula 2, $R_0$ is $CH(CF_3)CF_2$.

8. The electrolyte for a lithium secondary battery of claim 1, wherein the electrolyte is a solid electrolyte or a gel electrolyte.

9. The electrolyte for a lithium secondary battery of claim 1, wherein the inorganic solid electrolyte particle comprises at least one element selected from the group consisting of Li, La, Zr, O, Ti, Al, Ge, P, W, Nb, Te, Ln, Si, Nd, N, S, Ba, Ga, In, F, Cl, Br, I, As, Se, Sb, Sn, and Ru.

10. The electrolyte for a lithium secondary battery of claim 1, wherein the ferrodielectric comprises at least one element selected from the group consisting of Li, La, O, Ti, Ge, P, Nb, Te, Ba, K, H, D, Ta, Bi, Pb, Rb and As.

11. The electrolyte for a lithium secondary battery of claim 1, wherein the one or more selected from the group consisting of the inorganic solid electrolyte particle and the ferrodielectric is included in an amount of 10 parts by weight to 900 parts by weight based on 100 parts by weight of the polymer.

12. A lithium secondary battery comprising the electrolyte for a lithium secondary battery according to claim 1.

13. The electrolyte for a lithium secondary battery of claim 1, wherein the polymer represented by Formula 1 has a weight molecular weight (Mw) of 1,000 g/mol to 1,000,000 g/mol.

14. The electrolyte for a lithium secondary battery of claim 1, wherein the polymer represented by Formula 2 has a weight molecular weight (Mw) of 5,000 g/mol to 2,000,000 g/mol.

15. The electrolyte for a lithium secondary battery of claim 1, wherein in Formula 2, a molar ratio of m:n is 1:1 to 10:1.

* * * * *